(12) United States Patent
Olszewski

(10) Patent No.: US 6,997,083 B1
(45) Date of Patent: Feb. 14, 2006

(54) MOTORIZED CONDUIT LINKING DEVICE AND METHOD

(75) Inventor: William Olszewski, Bear, DE (US)

(73) Assignee: Battaglia Electric, Inc., New Castle, DE (US)

( * ) Notice: Subject to any disclaimer, the term of this patent is extended or adjusted under 35 U.S.C. 154(b) by 181 days.

(21) Appl. No.: 10/631,975

(22) Filed: Aug. 1, 2003

(51) Int. Cl.
B21D 39/00 (2006.01)

(52) U.S. Cl. .................... 81/57.39; 29/237; 29/243.55

(58) Field of Classification Search ................. 29/428, 29/237, 238, 241, 243.55, 255; 81/57.39
See application file for complete search history.

(56) References Cited

U.S. PATENT DOCUMENTS

| | | | | | |
|---|---|---|---|---|---|
| 3,659,880 | A | * | 5/1972 | Goldsobel | ................. 285/149.1 |
| 5,226,231 | A | * | 7/1993 | De Leebeeck | ................ 29/237 |
| 5,687,954 | A | * | 11/1997 | Schroeder | ........... 254/134.3 FT |
| 5,937,501 | A | * | 8/1999 | Imgram | ........................ 29/525 |
| 6,230,589 | B1 | * | 5/2001 | Junkers | ..................... 81/57.39 |
| 6,612,010 | B1 | * | 9/2003 | Bekkevold et al. | ........... 29/429 |
| 6,722,232 | B1 | * | 4/2004 | Day | .......................... 81/57.28 |

OTHER PUBLICATIONS

RIGID Catalog No. RT-198; Mar. 1998.

\* cited by examiner

Primary Examiner—Jacob K. Ackun, Jr.
(74) Attorney, Agent, or Firm—Fish & Richardson P.C.

(57) ABSTRACT

A motorized device for linking sections of threaded conduit such as electrical conduit, and a method of linking such conduit are described. In one form, the device is formed as a motorized tool, including a motor (such as an electric motor) and a bit. The motor is coupled to the bit, for example via a rotating collar and/or chuck, so that the motor can drive the bit rotationally. The bit preferably includes a drive ring with internal threads, where the drive ring is adapted (i.e., sized and shaped) so that the internal threads engage external threads on the ends of the conduit sections. The motor can be actuated to rotate the bit, thereby screwing the conduit into a connector. In another form, a bit is adapted for connection to a chuck and/or collar of a motorized drive, for example a prior art threading tool. A method for using a motorized tool to link sections of conduit using a bit or motorized tool is also described.

6 Claims, 5 Drawing Sheets though in some cases, as discussed in more detail below, bit 11 may be used instead of or in conjunction with a prior art threading tool, such as Current Tools Model 77 electric pipe threader (as shown in FIG. 8).

MOTORIZED CONDUIT LINKING DEVICE AND METHOD

TECHNICAL FIELD

This description relates to a device and method for connecting sections of electrical conduit, and more particularly to a tool or bit for the motorized connection of threaded electrical conduit, and a method of connecting such conduit.

BACKGROUND

Many industrial applications require the linking or connection of sections of hollow conduit. For example, electrical wiring for industrial or commercial applications is frequently maintained in lengths of hollow conduit. Such conduit is typically round in cross-section, ranging in size, for example, from two to six inches in diameter (although others sizes may also be used). In many cases, this conduit is manufactured or cut into given lengths, which have externally threaded ends. Long runs of conduit can be formed using connectors, for example short sections of piping of slightly wider diameter and having internal threads. The internal threads of the connectors cooperate with the external threads of the conduit to link the ends together.

It is known to connect such sections of threaded conduit manually, using large, heavy wrenches to rotate one section with respect to the connector and/or an abutting section of conduit. Manual connection of threaded conduit in this manner is a labor-intensive and time-consuming activity, given factors such as the weight and size of the conduit, the weight and size of the manual wrenches used to rotate the conduit, and the limited area of movement available in some cases. In large installations, for example, sometimes thousands of conduit sections must be linked together to form the necessary runs, compounding the disadvantages of known tools and methods of linking conduit.

SUMMARY

In one general aspect, a motorized device for linking sections of threaded conduit such as electrical conduit, and a method of linking such conduit are described. In one implementation, the device is formed as a motorized tool, including a motor (such as an electric motor) and a bit. The motor is coupled to the bit, for example via a rotating collar and/or chuck, so that the motor can drive the bit rotationally. The bit includes a drive ring with internal threads, where the drive ring is adapted (i.e., sized and shaped) so that the internal threads engage external threads on the ends of the conduit sections. The motor can be actuated to rotate the bit, thereby screwing the conduit into a connector.

In another implementation, a bit is adapted for connection to a chuck and/or collar of a motorized drive, for example a prior art threading tool. The bit includes a head having a drive ring described above. The bit may optionally include a shaft and/or base for fixedly or releasably connecting the bit to a collar of the motorized drive, as well as other features described in more detail below. In an alternative implementation, the shaft may releasably connect with a chuck, which in turn connects with a collar of the motorized drive.

Implementations also include a method for using a motorized tool to link sections of conduit. Such an implementation includes arranging a first piece of conduit, the connector, and a second piece of conduit so that an end of the first piece of conduit is seated in the connector, and so the connector is abutting an end of the second piece of conduit; engaging the near end of the second piece of conduit with a motorized tool and bit; and actuating the motorized tool so that the bit causes the second piece of electrical conduit to rotate until it is seated in the connector.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

Detailed Description

Figure 6:
FIG. 6 is a side view of a prior art spring washer for use with a bit.

The invention relates to devices and methods for linking sections of threaded conduit, for example electrical conduit 91, as shown in FIG. 6. Electrical installations, for example, frequently require runs of hollow rigid conduit. Typically, such conduit can range in length up to ten feet, and is typically used in diameters ranging from approximately two to six inches, although the invention is not limited to conduit of any particular size. Examples of such conduit include rigid metal conduit, for example aluminum or galvanized steel, "plasti-bond" (plastic-coated) pipe, and Schedule 40 and Schedule 80 conduit. The invention generally relates to any rigid conduit or pipe that is linked with external threads, such as threads 93 of FIG. 10, including but not limited to the types described above.

Figure 10:
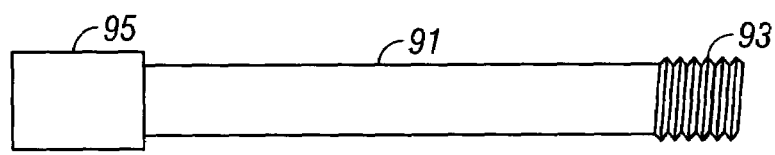
FIG. 10 is a side view of prior art conduit with an attached prior art connector.

Sections of threaded conduit 91 are often linked using cylindrical connectors 95 having internal threads that cooperate with external threads 93 on the ends of the conduit, as shown in FIG. 10. Connector 95 may typically range from two to six inches in length, and have a cross-sectional diameter sized to cooperate with the particular diameter of conduit being used, although the invention is not limited by the size of connector 95. In practice, two adjacent ends of conduit 91 may be screwed into connector 95 until the ends are firmly fixed or "seated" in the connector, thereby linking the two pieces of conduit 91. Given the size of the conduit 91 and connectors 95, it may take substantial time to manually rotate a section of conduit 91 before it becomes seated in a connector 95.

Figure 1:
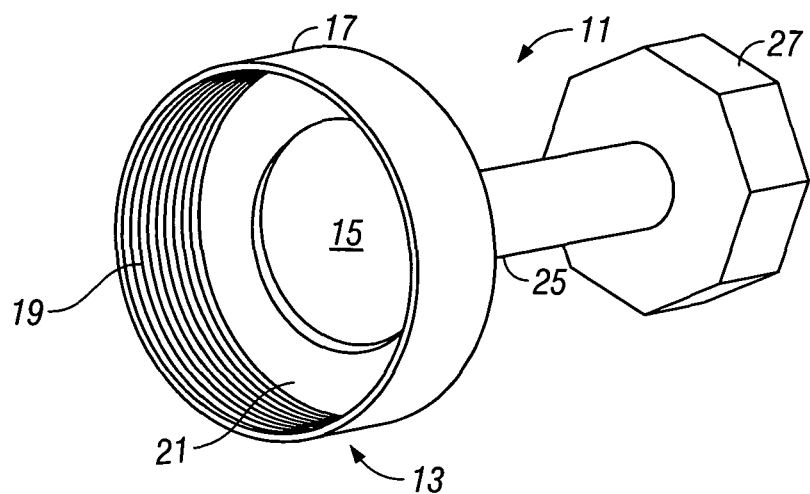
FIG. 1 is a perspective view of an implementation of a bit.
Figure 2:
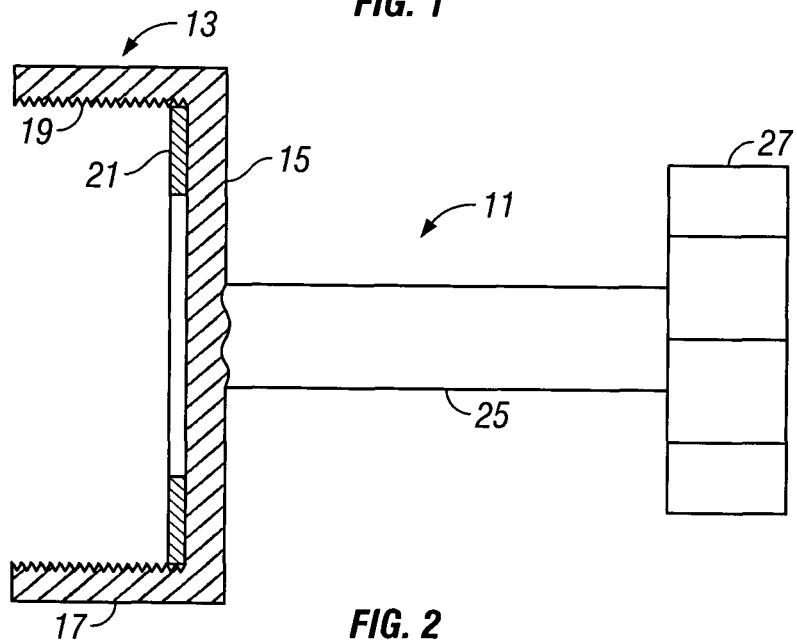
FIG. 2 is a partial cut-away cross-sectional view of the bit of FIG. 1.

FIGS. 1 and 2 show an examplary bit 11. Bit 11 may be used with any motorized drive 31 adapted to rotate bit 11.

Figure 8:
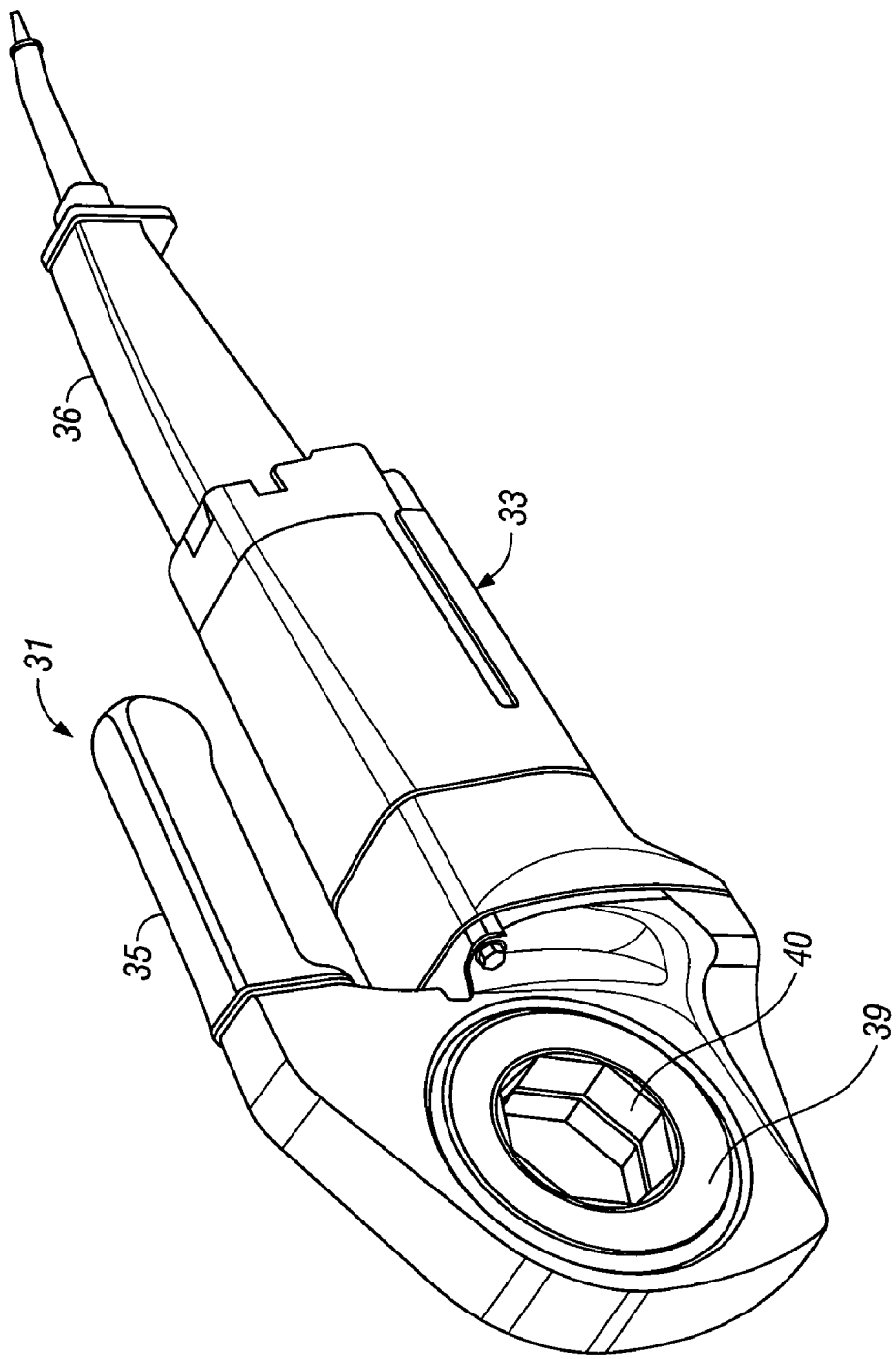
FIG. 8 is a perspective view of a prior art motorized drive for use with a bit or method.

Examples of suitable motorized drives include prior art devices of the type shown in FIG. 8, or other arrangements as described below. In particular, suitable prior art motorized drives include the Model 600 and Model 700 power drivers made by Ridge Tool Company of Elyria, Ohio.

FIGS. 1 and 2 illustrate an exemplary implementation of bit 11. Bit 11 generally includes a head 13, which may be coupled to a base 27. Head 13 and base 27 are preferably connected by a shaft 25. The term "coupled," however, should be understood to include both direct connections between two components, or indirect connections through other components. Accordingly, it is understood that base 27 and head 13 may be directly connected, or may be connected via a component such as shaft 25. It is also understood that while shaft 25 is illustrated has having a relatively small diameter compared to head 13 and base 27, the invention is not limited to such arrangements.

Figure 7:
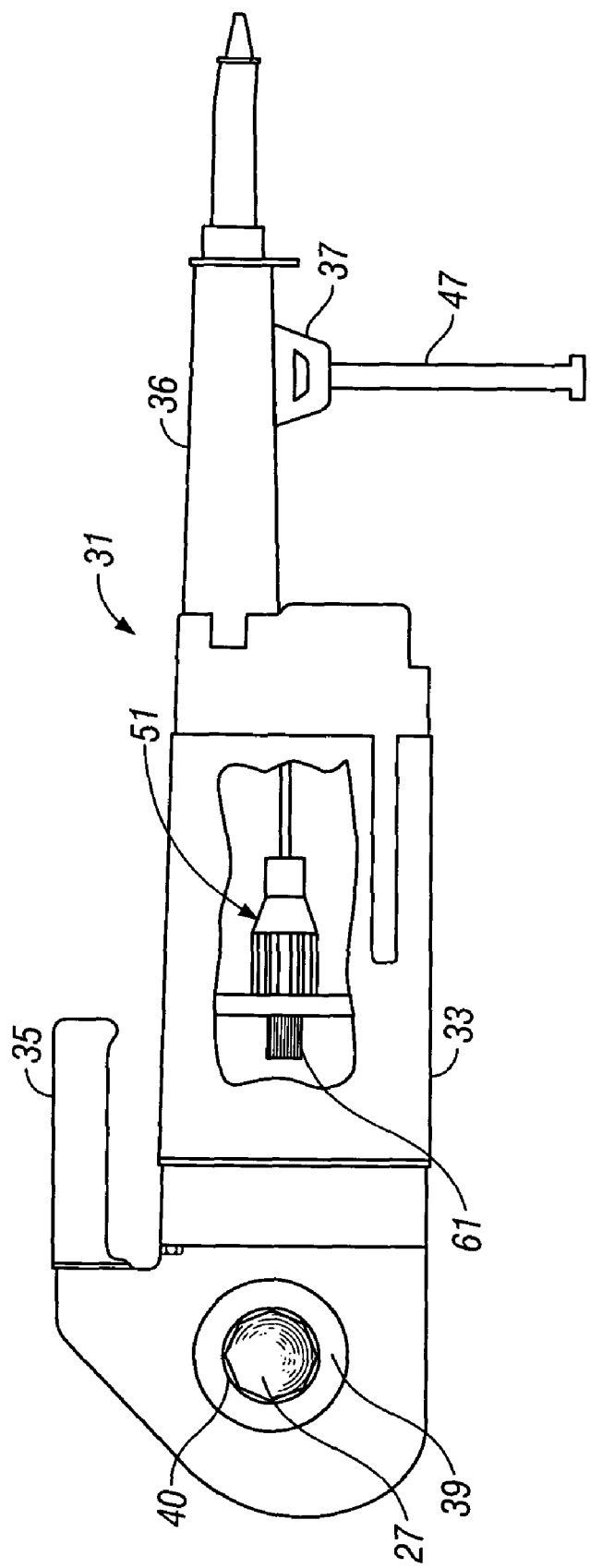
FIG. 7 is a partial cut-away cross side view of a motorized tool.

In this implementation, base 27 is adapted for connection to a motorized drive mechanism 31, as shown in FIG. 7. In a preferred implementation, base 27 is releasably connected to motorized drive mechanism 31, and may be suitably shaped to connect to a rotating collar 39 of drive mechanism 31. In an alternative implementation, base 27 and chuck 41 may be fixed together, or formed as a single component. Such a single component should be understood to include both base 27 and chuck 41, even if they are not individually distinguishable.

In the preferred implementation of FIG. 1, base 27 is formed with a polygonal cross section that cooperates with a similarly-shaped retaining structure 40 of collar 39. It is understood that any suitable cooperating arrangement may be used. This could include geared, slotted or grooved arrangements, clamping or magnetic arrangements (with or without other mechanical cooperative features), quick-release chucks, and the like. Many such arrangements are readily available to one skilled in the art, and it should be understood that the invention is not limited to any particular design.

Figure 3:
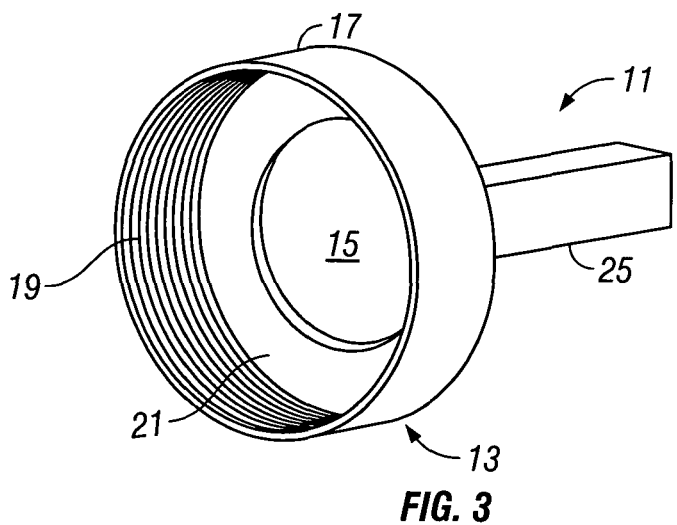
FIG. 3 is a perspective view of another implementation of a bit.
Figure 4:
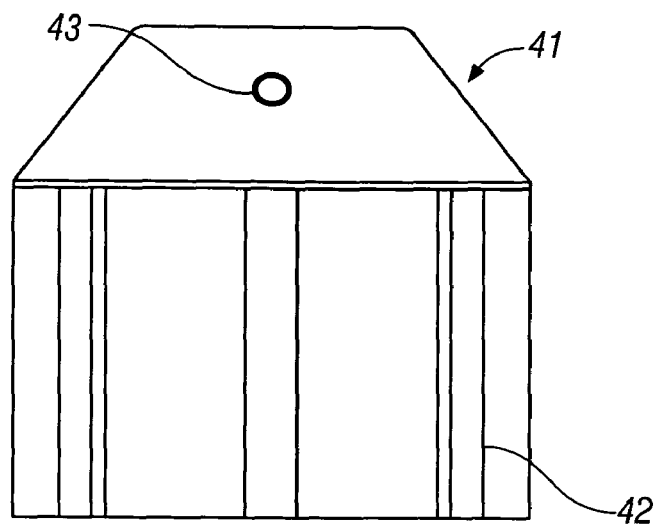
FIG. 4 is a side view of a prior art chuck for use with a bit.
Figure 5:
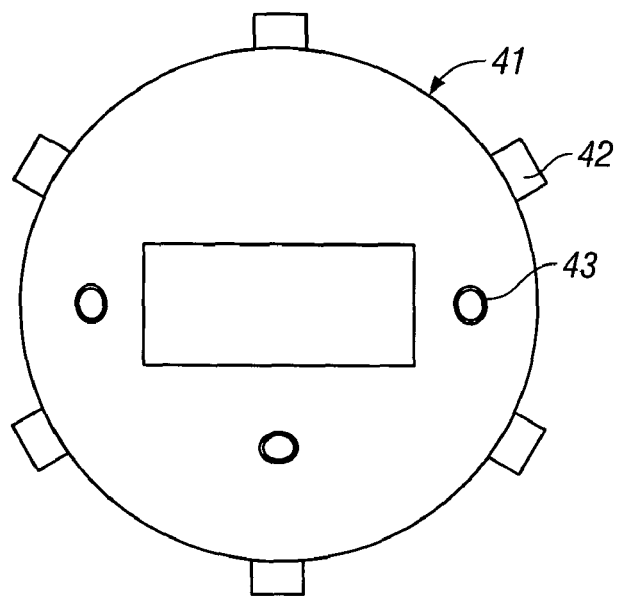
FIG. 5 is a top view of the chuck of FIG. 4.

One such alterative implementation is shown in FIGS. 3–5. In this implementation, bit 11 does not include a base 27. Instead, bit 11 is adapted for releasable connection with chuck 41, which in turn may be connected to rotating collar 39. As illustrated, chuck 41 includes a rectangular aperture for receiving shaft 25 of bit 11. Screw holes 43 are provided so that bit 11 may be firmly attached to chuck 41. Chuck 41 also includes, in this illustrated implementation, longitudinal teeth 42, that cooperate with keys or grooves of a collar 39 to retain chuck within collar 39. Again, it is understood that this particular cooperating arrangement between chuck 41 and collar 39 is examplary, and many arrangements are available as understood by one skilled in the art.

Head 13 includes drive ring 17. Drive ring 17 includes, on an internal face, internal thread 19 (where the singular "thread" is understood to include multiple-thread arrangements, and vice versa). Drive ring 17 and internal thread 19 are adapted to engage and cooperate with external thread 93 of conduit 91 (see FIG. 10). In a preferred implementation, head 13 further includes plate 15, which may provide rigidity and support, for example, when head 13 is connected to shaft 25.

Head 13 may further include O-ring 21. O-ring 21 may be disposed within drive ring 17 to provide relief or separation between conduit 91 and plate 15. When present, O-ring 21 may reduce binding between conduit 91 and bit 11, and allow easier removal of bit 11 from conduit 91 following use. Preferred O-ring materials include rubber or Teflon®. In another preferred implementation, O-ring 21 is provided in the form of spring washer 22, which is preferably made of metal such as spring steel (although any suitable material may be used).

Drive ring 17, plate 15, shaft 25 and base 27 may be formed of any suitable materials, but metals such as steel are preferred. These components may be cast or machined integrally, or may be formed separately by casting, molding or machining, and subsequently connected, for example by welding.

Figure 9:
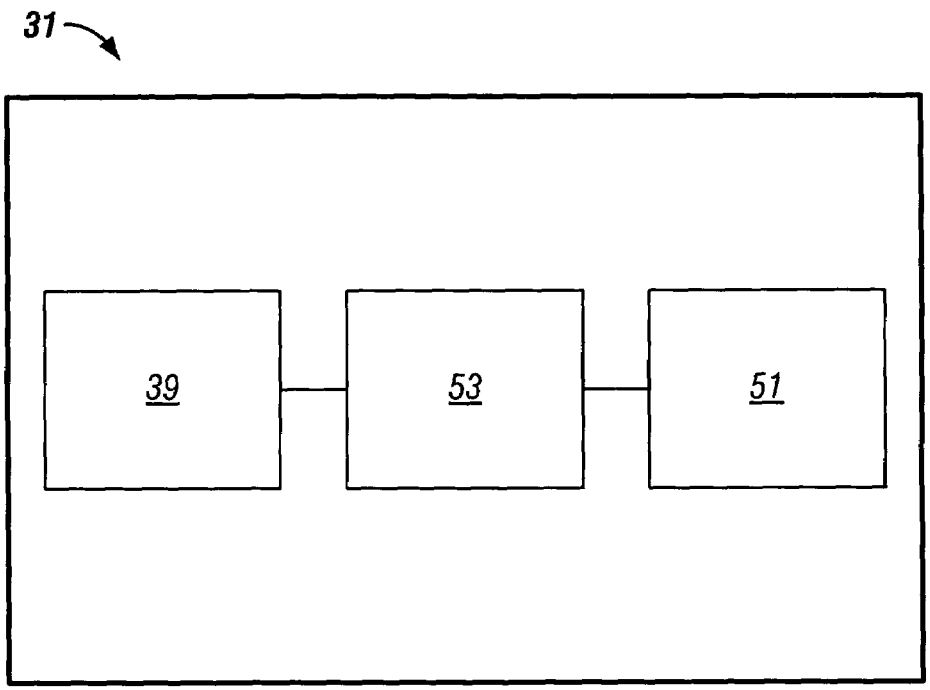
FIG. 9 is a schematic view of a motorized drive tool for use with a bit or method.

FIGS. 7 and 9 show a motorized tool 31 according to another implementation. Motorized tool 31 generally includes a housing 33 with a motor 51. Housing 33 preferably includes a top handle 35 and rear handle 36 to allow easy manipulation by an operator, although the invention is not limited to any given arrangement. Motor 51 is preferably an electric motor, but gas or other types of motors may be utilized. Motor 51 is coupled to rotating collar 39, and this coupling between motor 51 and rotating collar 39 may be any suitable coupling or driving arrangement, such as with gear 61 shown in FIG. 3. It should be understood that motor 51 is capable of driving collar 39 in a forward and reverse direction, as is well known in the art.

In an alternative implementation, motor 51 may be connected to clutch 53, and clutch 53 may be connected to collar 39, as shown schematically in FIG. 9. Clutch 53 may be any known type of mechanical or electronic clutch, and may include suitable features for providing maximum torque, safety slippage, etc.

Drive mechanism 31 may optionally include support arm 47, which may rest against the ground or other structure to reduce any stabilizing force required by the operator. Preferably, support arm 47 is releasably attached to drive mechanism 31 using any suitable known arrangement, as would be understood by one skilled in the art. In the illustrated implementation, support arm is disposed transverse to the longitudinal axis of housing via a latch mechanism 37, but various arrangement and designs are readily available to one skilled in the art.

Figure 11:
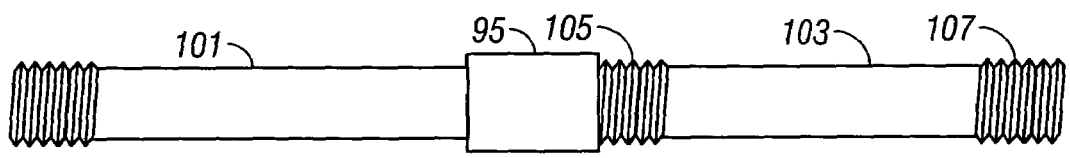
FIG. 11 is a schematic view of an arrangement of components for a process.

In practice, bit 11 is rotated by motor 51 to rotate conduit 91, screwing conduit 91 into connector 95 until conduit 91 is adequately fixed or "seated " in connector 95. In particular, in a method of linking conduit according to the present invention, a first section or piece of conduit 101 is provided, which has previously been attached to a connector 95, i.e., partially or fully seated in a connector 95 (see FIG. 11). A second piece of conduit 103 is arranged so that so the connector 95 is abutting a distal end 105 of the second piece of conduit 103. In this context, the term "abutting" is understood to mean that the second piece of conduit 103 contacts connector 95. Typically, this may include arrangements in which conduit 103 has been rotated slightly into the connector 95, so that the threads of the components are engaged and the seating process is "started." When conduit 103 is abutting connector 95, rotation of the second piece of conduit 103 will screw the conduit 103 into connector 95, until the second piece of conduit 103 is seated in connector 95 and thus linked to the first piece of conduit 101.

With the distal end 105 of the second piece of conduit 103 abutting connector 95, a proximal end 107 of the second piece of conduit 103 may be engaged by motorized tool 31. As set forth above, motorized tool 31 preferably includes a motor 51 coupled to a bit 11 so that motor 51 can cause bit 11 to rotate. Bit 11 includes a drive ring 17 having internal threads 19, which are adapted to cooperate with external threads on the proximal end 107 of the second piece of conduit 103. At this point, actuating the motorized tool 31 may initially cause bit 11 to rotate on to proximal end 107 of the second piece of conduit 103. Continued rotation of bit 11 will rotate the second piece of conduit 103 into connector 95. Preferably, lubricant may be added to distal end 105 to facilitate rotation.

As bit 11 rotates, and as conduit 103 is screwed into connector 105, at certain times conduit 103 may stop rotating temporarily, so that bit 11 rotates around conduit 103. In this manner, conduit 103 may become partially or fully seated within drive ring 19. It should be understood that any temporary absence of rotation of the second piece of conduit 103, and any seating within drive ring 19 (or absence thereof), is within the scope of the invention.

Once the distal end 105 of the second piece of conduit 103 is seated in connector 95, motor 51 may be reversed and bit 11 removed from proximal end 107. In some cases, there may be binding between bit 11 and conduit 103, but bit 11 can be removed by holding conduit 103 steady until bit 11 freely rotates off conduit 103.

A number of implementations have been described. Nevertheless, it will be understood that various modifications may be made without departing from the spirit and scope of the invention. For example, support arm 47 may telescope, or rotate to different positions to allow support in a variety of orientations. Accordingly, other implementations are within the scope of the following claims.

What is claimed is:

1. A method of linking lengths of conduit using a connector having internal thread, the conduit having external threads at each end, comprising:
   arranging a first piece of conduit, the connector, and a second piece of conduit so that a proximal end of the first piece of conduit is attached to the connector, and so the connector is abutting a distal end of the second piece of conduit;
   engaging a proximal end of the second piece of conduit with a motorized tool, the motorized tool comprising a motor coupled to a bit so that the motor can cause the bit to rotate, the bit including a drive ring having internal threads, the internal threads being adapted to cooperate with external threads on the proximal end of the second piece of conduit; and
   actuating the motorized tool so that the bit rotates and causes the second piece of conduit to rotate until the distal end of the second piece of conduit is seated in the connector.

2. The method according to claim 1, wherein the motorized tool further comprises:
   a housing,
   the motor being disposed within the housing, and
   at least one of a rotating collar and chuck coupled to the motor, for coupling the bit with the motor.

3. The method according to claim 1, wherein lubricant is applied to the distal end of the second piece of conduit before actuating the motorized tool.

4. The method according to claim 1 wherein after the distal end of the second piece of conduit is seated in the connector, the bit is rotated in reverse off the proximal end of the second piece of conduit.

5. The method according to claim 1, wherein the first and second pieces of conduit are metal conduit.

6. The method according to claim 3, wherein the drive ring is sized to engage conduit between two and six inches in diameter.

* * * * *